United States Patent [19]

Ichigaya et al.

[11] Patent Number: 4,896,081

[45] Date of Patent: Jan. 23, 1990

[54] AUTO CONVERGENCE CIRCUIT

[75] Inventors: Hiroshi Ichigaya; Yoshirou Ishikawa; Hiromu Hosokawa, all of Tokyo, Japan

[73] Assignee: Sony Corporation, Tokyo, Japan

[21] Appl. No.: 265,247

[22] Filed: Oct. 31, 1988

[30] Foreign Application Priority Data

Oct. 31, 1987 [JP] Japan .................................. 62-276787

[51] Int. Cl.[4] ........................ H01J 29/70; H04N 17/02
[52] U.S. Cl. ....................................... 315/368; 358/10
[58] Field of Search ..................... 315/368.10; 358/10, 358/67–69

[56] References Cited

U.S. PATENT DOCUMENTS 4,617,495 10/1986 Culter .................................. 315/368

Primary Examiner—Thomas H. Tarcza
Assistant Examiner—Gregory C. Issing
Attorney, Agent, or Firm—Lewis H. Eslinger; Jay H. Maioli; Donald S. Dowden

[57] ABSTRACT

An electronic circuit automatically corrects the convergence of an electron beam of a color cathode ray tube. Light reflected upon scanning by the electron beam of an index pattern disposed at a predetermined position on the shadow mask of the color cathode ray tube is detected by a photodetector. A detected signal representative of the scanning position of the electron beam is obtained, and convergence error information is obtained based on the detected signal. The correcting circuit comprises an integrator for integrating the detected signal produced during a plurality of traverses of the index pattern by the electron beam. The convergence error information is based on the result of the integration. The effect of noise included in the detected signal is thereby reduced, and convergence correction with increased accuracy is obtained.

10 Claims, 4 Drawing Sheets

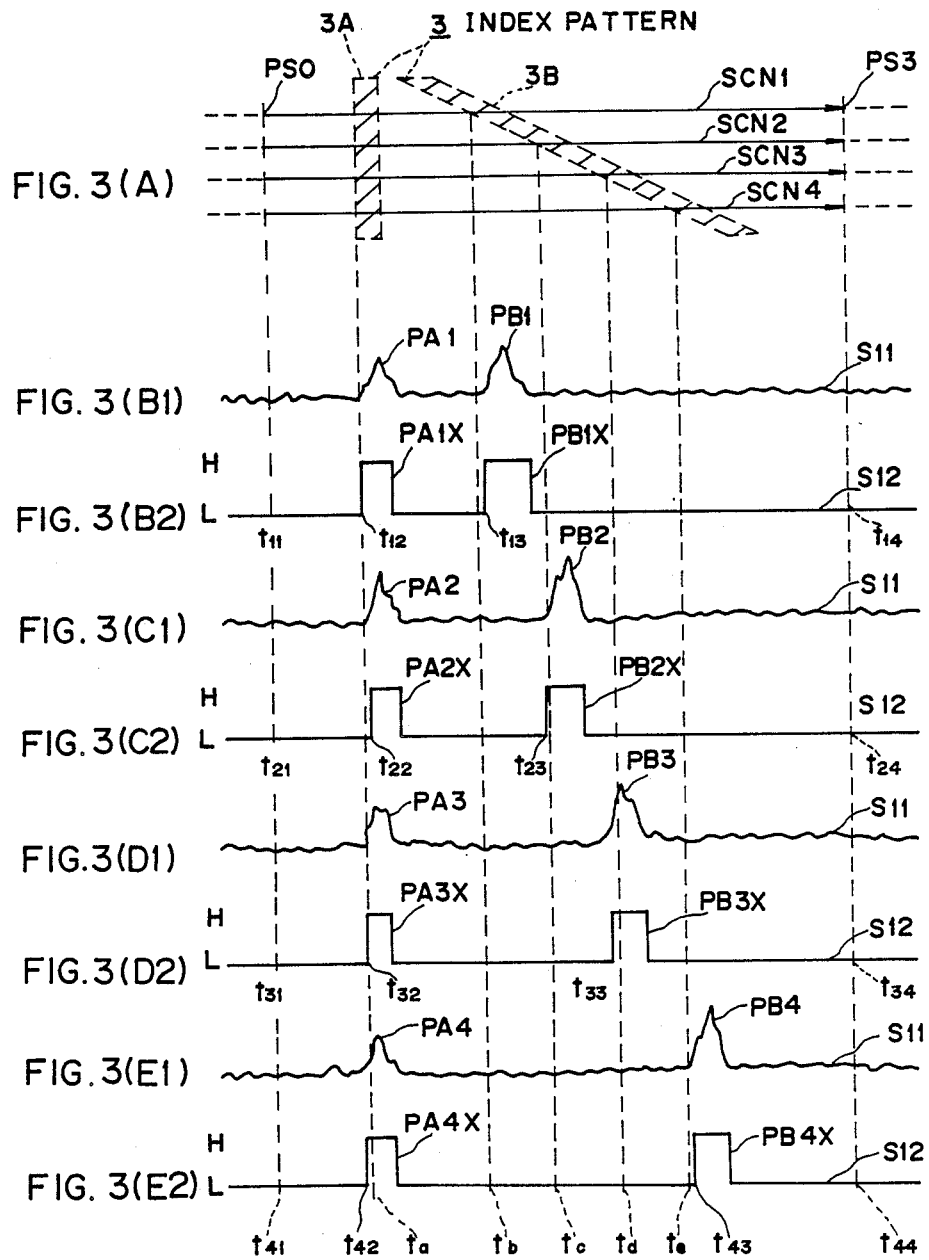

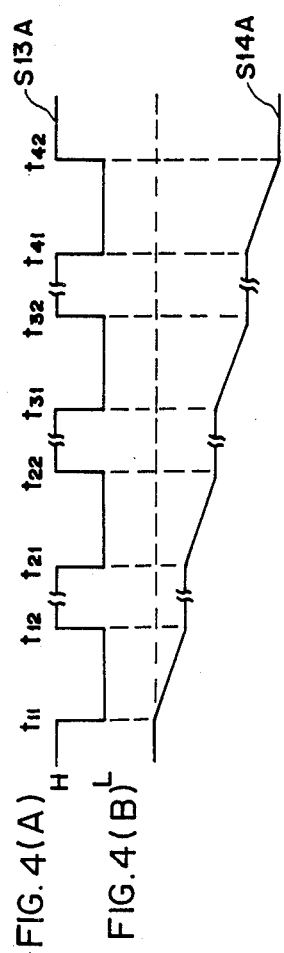
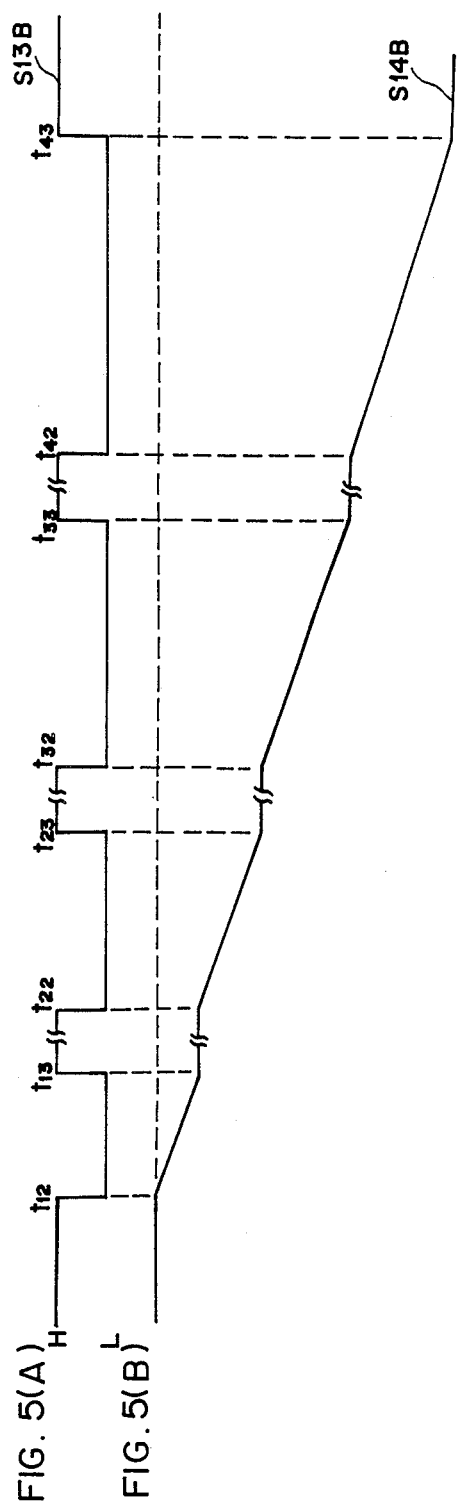

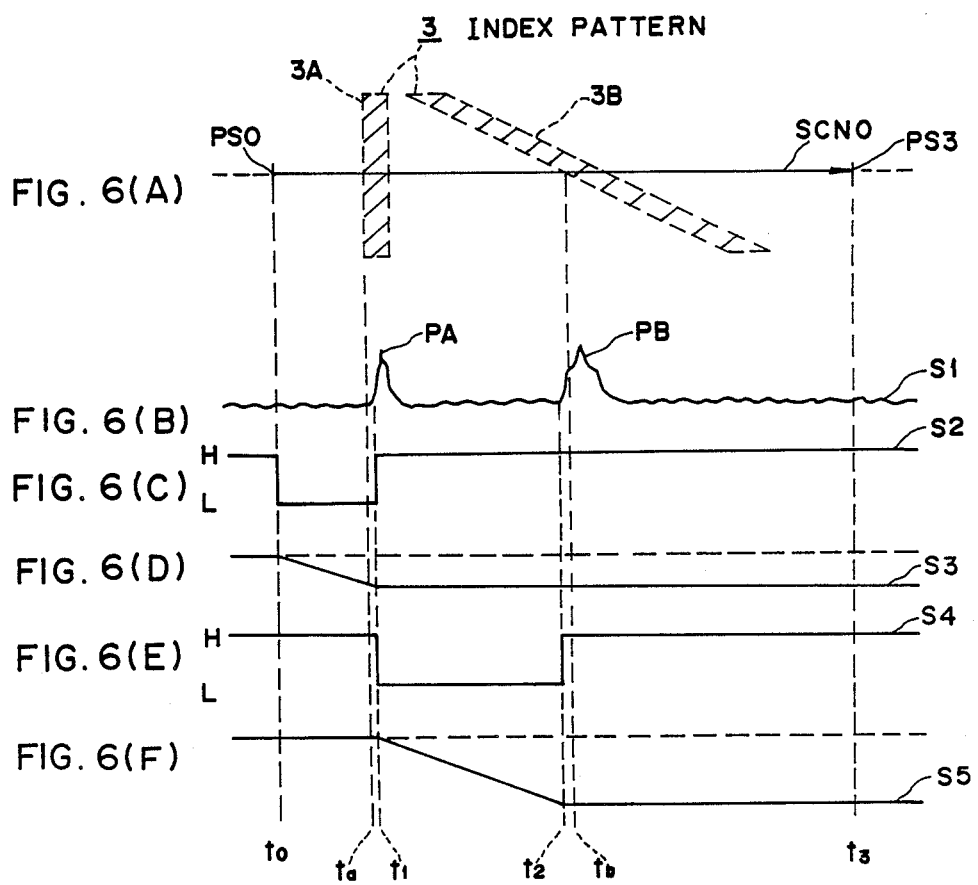

AUTO CONVERGENCE CIRCUIT

BACKGROUND OF THE INVENTION

1. Field of the Invention

The present invention relates to an automatic convergence correcting circuit for controlling an electron beam of a cathode ray tube and more particularly to such a circuit that is adapted to effect automatic convergence correction by the use of index patterns.

2. Description of the Prior Art

There has been proposed a cathode ray tube including a circuit that is adapted to effect automatic convergence correction by the use of index patterns provided on the back of a shadow mask (U.S. Pat. Nos. 4,617,495 and 4,456,853).

That is, in a cathode ray tube 1, as shown in FIG. 2, a phosphor material is applied to the surface of a shadow mask 2 on the side thereof that faces towards the electron gun, whereby position detecting patterns 3 (hereinafter called index patterns) respectively representative of different positions on the display screen are formed. Thus, when an electron beam 4 makes a raster scan of a display screen 5 along horizontal scanning lines through the shadow mask, the electron beam 4 illuminates the index patterns 3 so that light is emitted therefrom, and this light is converted into a detection signal S11 by, for example, a photodetector 11 provided at the cone portion of the cathode ray tube. A convergence circuit is controlled with the thus detected signal, and the deflected position of the electron beam 4 is thereby automatically adjusted.

The index pattern typically has the form of a so-called lambda pattern. That is, it is formed, as FIG. 6(A) shows, of a first belt-like or strip pattern section 3A extending in the vertical direction and a second belt-like or strip pattern section 3B extending in an oblique direction, for example at an angle of 30° with the horizontal direction, from a position a predetermined distance apart from the first pattern section and in confronting relation thereto. Such lambda patterns are distributed all over the display screen 5 and form a matrix with predetermined spacings in the horizontal and vertical directions.

Thus, when the electron beam 4 makes a horizontal scan from one reference position PSO to the other reference position PS3 along a scanning line SCNO at a level virtually in the middle of the height in the vertical direction of the first and second pattern sections 3A and 3B (FIG. 6(A)), abruptly rising pulse signals PA and PB are generated in succession by the photodetector 11 at the times $t_a$ and $t_b$ when the electron beam 4 arrives at the positions to start illuminating the pattern sections 3A and 3B (FIG. 6(B)).

Since, in FIG. 6A, the first pattern section 3A extends in the vertical direction, the time at which the pulse signal PA rises indicates the position of the index pattern in the horizontal direction on the display screen. On the other hand, since the second pattern section 3B extends in an oblique direction, the period of time that elapses from the time at which the pulse signal PA rises to the time at which the pulse signal PB rises represents the position in the vertical direction of the index pattern 3.

At the time $t_0$, when a red electron beam, for example, passes the illumination starting point, an integral controlling signal S2 (FIG. 6(C)) for a ramp signal generator is lowered to a logical level "L" to start an integrating operation, whereby a ramp signal S3 (FIG. 6(D)) is generated. Thereafter, at the rising time $t_1$ of the pulse signal PA (FIG. 6(B)) to be detected as the electron beam passes the pattern section 3A, the integral controlling signal S2 is reset to a logical level "H" and thereby the integration is stopped. The value of the ramp signal S3 at this time is stored as the detected value of the position of the index pattern in the horizontal direction.

Detected values S3 of the positions in the horizontal direction for the green and blue electron beams are obtained similarly.

The thus obtained detected values S3 of the positions in the horizontal direction are compared with a reference value of the position in the horizontal direction. Any deviation that such a comparison reveals indicates that an error is present in the horizontal convergence of the electron beam, and hence a horizontal convergence error signal is supplied to a convergence and deflection circuit so that the error is corrected.

Then, at the rising time $t_1$ of the pulse signal PA corresponding to the red electron beam, for example, which occurs when the electron beam reaches the pattern section 3A, an integral controlling signal S4 (FIG. 6(E)) is lowered to a logical level "L" to start an integrating operation in the ramp signal generator, whereby a ramp signal S5 FIG. 6(F)) is generated. Thereafter, at the rising time $t_2$ of the pulse signal PB, which occurs when the electron beam reaches the second pattern section 3B, the integral controlling signal S4 is reset to a logical level "H", so that the integrating operation is stopped. The value of the ramp signal S5 at this time is stored as the detected value corresponding to the position of the index pattern in the vertical direction.

Detected values S5 of the positions in the vertical direction for the green and blue electron beams are obtained similarly.

The thus obtained detected values of the positions in the vertical direction are compared with a reference value of the position in the vertical direction, and if there is any deviation, it indicates that an error is present in the vertical convergence of the electron beam, and hence a vertical convergence error signal is supplied to the convergence and deflection circuit so that the error is corrected.

Thus, deflection waveform signals capable of convergence correction are obtained based on the horizontal and vertical error signals, and convergence correction coils are driven in accordance with these signals so that the convergence is corrected.

However, when an attempt is made to adjust the convergence automatically through the method described above, there has been a problem resulting from the fact that the S/N (signal-to-noise) ratio of the signal S1 detected by the photodetector is deteriorated because the light emitted from the phosphor material forming the index pattern is weak and the signal is susceptible to electrical noise within the cathode ray tube. Hence, the rising times $t_1$ and $t_2$ of the pulse signals PA and PB obtained from the detected signal S1 are liable to deviate to a certain degree from the times $t_a$ and $t_b$ at which the electron beam actually reaches the pattern sections 3A and 3B. Therefore, it has been difficult to carry out the automatic convergence adjustment with high accuracy when it is performed based on the times $t_1$ and $t_2$.

In practice, in order to obtain the integral controlling signals S2 and S4 from the detected signal S1, a method is used wherein the detected signal S1 is sliced at predetermined slice levels, and the integral controlling signals S2 and S4 are raised from a logical level "L" to a logical level "H" at the rising times of the sliced output. However, if a noise whose signal level is close to the slice level is mixed in with the detected signal S1, then a deviation of the rising time of the sliced output will occur.

To solve that problem, it is possible to perform raster scanning on the entire scanning plane a number of times and perform the integration for each index pattern a number of times, so that the plurality of integrated results are averaged and the portion of the noise component included in the signal is thereby reduced. But that approach gives rise to the problem that the processing time is increased by the need to perform a plurality of raster scans on the scanning plane.

SUMMARY OF THE INVENTION

An object of the present invention is to solve the problems outlined above. In particular, an object of the invention is to provide an automatic convergence control circuit capable of convergence adjustment with high accuracy without prolonging the processing time.

In accordance with a preferred aspect of the invention, an automatic convergence correcting circuit is provided for use with a color cathode ray tube formed with a shadow mask, at least one index pattern disposed at a predetermined position on the shadow mask, means for generating an electron beam for scanning the index pattern in a plurality of traverses, and means for detecting light reflected upon scanning of the index pattern by the beam and generating a detected signal that corresponds to the reflected light and is representative of the scanning position of the electron beam. The correcting circuit comprises integration means for integrating the detected signal produced in the plurality of traverses of the index pattern to produce an integrated output signal; and means responsive to the integrated output signal for generating a signal representing convergence error information for controlling the convergence of the electron beam; whereby the effective noise included in the detected signal is reduced and convergence correction with increased accuracy is obtained.

BRIEF DESCRIPTION OF THE DRAWINGS

FIGS. 3(A)–3(E2) are a signal waveform chart showing one repetition of a lambda-type index pattern and detected signals corresponding thereto according to the present invention;

FIGS. 4(A)–4(B) and 5(A)–5(B) are signal waveform charts showing integral controlling signals based on the detected signals, and ramp signals formed by integration; and FIG. 6(A)–6(F) are a signal waveform chart useful for explaining certain problems attendant upon the prior art.

DESCRIPTION OF THE PREFERRED EMBODIMENT

A preferred embodiment of the present invention is described in detail below with reference to the accompanying drawings.

Figure 1:
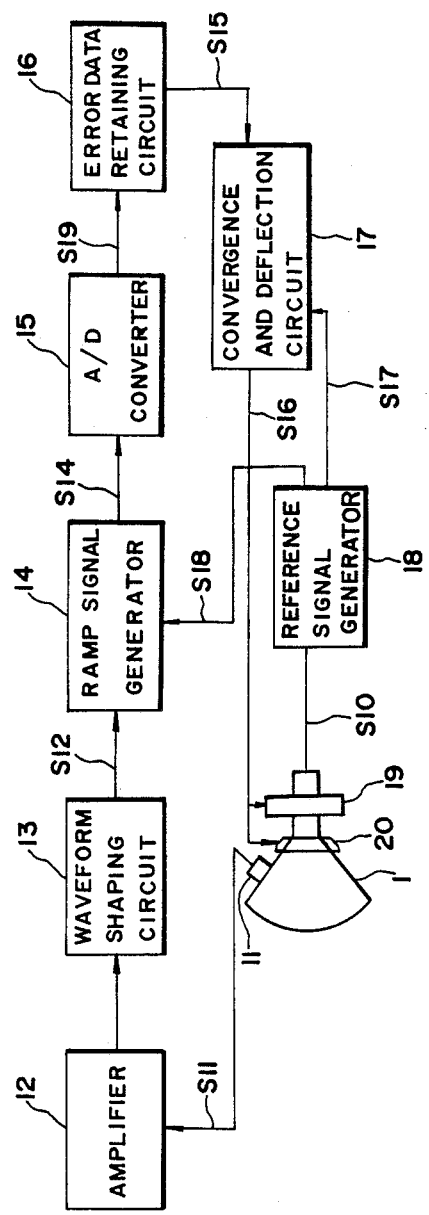
FIG. 1 is a block diagram showing a preferred embodiment of the present invention.
Figure 2:
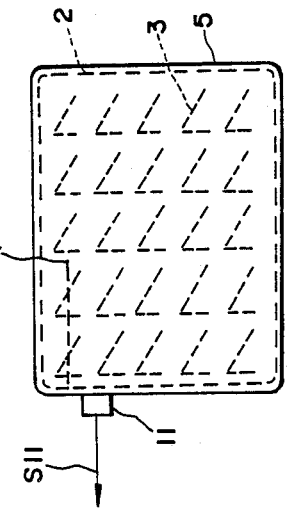
FIG. 2 is a front view of an index pattern distribution example as it would appear if visible through the display faceplate of a cathode ray tube.

In FIG. 1, 10 denotes an automatic convergence correcting circuit as a whole. When an electron beam 4, the point of impingement of which is shown in FIG. 2, scans a display screen 5 of a cathode ray tube 1, the electron beam 4 is adapted, as shown in FIG. 3(A), to scan along a plurality of scanning lines, for example four scanning lines SCN1–SCN4, which respectively pass horizontally through predetermined positions of one index pattern 3.

Thus, at the times $t_a$ and $t_b$, when the electron beam 4 reaches the patterns 3A and 3B along the first scanning line SCN1, pulse signals PA1 and PB1 are obtained through a photodetector 11 (FIG. 1) as a detected signal S11 (FIG. 3(B1)). Similarly, at the time $t_a$, when the electron beam 4 passes the pattern 3A along the second, third, and fourth scanning lines SCN2, SCN3, and SCN4, pulse signals PA2, PA3, and PA4 are obtained through the photodetector 11 as the detected signal S11. Also at the times $t_c$, $t_d$, and $t_e$, when the electron beam 11 reaches the pattern 3B, pulse signals PB2, PB3, and PB4 are obtained through the photodetector 11 (FIGS. 3(C1), (D1), (E1)).

The detected signal S11 is supplied through an amplifier 12 (FIG. 1) to a waveform shaping circuit 13. The waveform shaping circuit 13 converts the detected signal S11 containing noise into a two-value signal by slicing the signal at predetermined slice levels and thereby generates as an output a signal with shaped waveform S12 (FIGS. 1 and 3) whose logical level is "H" or "L".

In the case of the present embodiment, in connection with the first scanning line SCN1, a signal with shaped waveform S12 having pulses PA1X and PB1X respectively rising to a logical level "H" at times $t_{12}$ and $t_{13}$ approximately corresponding to the times $t_a$ and $t_b$ when the electron beam 4 passes the pattern sections 3A and 3B is obtained (FIG. 3(B2)).

Similarly, in connection with the second, third, and fourth scanning lines SCN2, SCN3, and SCN4, signals with shaped waveform S12 having pulses PA2X, PA3X, and PA4X respectively rising to a logical level "H" at times $t_{22}$, $t_{32}$, and $t_{42}$ approximately corresponding to the time $t_a$ when the electron beam 4 reaches the pattern section 3A are obtained. Also, signals with shaped waveform S12 having pulses PB2X, PB3X, and PB4X respectively rising to a logical level "H" at times $t_{23}$, $t_{33}$, and $t_{43}$ approximately corresponding to the time $t_b$ when the electron beam 4 reaches the pattern section 3B are obtained (FIGS. 3(C2), (D2), and (E2)).

In practice, a certain amount of noise is always mixed in with the detected signal S11. Hence, the rising times $t_{12}$, $t_{22}$, $t_{32}$, and $t_{42}$ of the signals with shaped waveform S12 corresponding to the time $t_a$ when the electron beam 4 reaches the pattern section 3A are not always coincident with the time $t_a$ but randomly deviate therefrom backward and forward in dependence on the noise. Similarly, the rising times $t_{13}$, $t_{23}$, $t_{33}$, and $t_{43}$ of the signals with shaped waveform S12 corresponding to the times $t_b$, $t_c$, $t_d$, and $t_e$, respectively, when the electron beam 4 reaches the pattern section 3B are not always coincident with the times $t_b$, $t_c$, $t_d$, and $t_e$ but randomly deviate therefrom backward and forward in dependence on the noise.

The signal with shaped waveform S12 is supplied to a ramp signal generator 14 (FIG. 1) as a timing signal for raising an integral controlling signal to a logical level "H". A reference signal S18 is supplied from a reference signal generator 18 as a timing signal for lowering the integral controlling signal to a logical level "L".

Thus, the ramp signal generator 14 generates as an output an integral controlling index signal S13A in the horizontal direction. As FIG. 4 shows, the signal S13A falls to a logical level "L" in accordance with the reference signal S18 at the times $t_{11}$, $t_{21}$, $t_{31}$, and $t_{41}$ and rises to a logical level "H" at the following times $t_{12}$, $t_{22}$, $t_{32}$, and $t_{42}$ in accordance with the pulses PA1X, PA2X, PA3X, and PA4X of the signal with shaped waveform S12.

Likewise, the ramp signal generator 14 generates as an output an integral controlling index signal S13B in the vertical direction. As FIG. 5(A) shows, the signal S13B falls to a logical level "L" in accordance with the pulses PA1X, PA2X, PA3X, and PA4X of the signal with shaped waveform S12 at the times $t_{12}$, $t_{22}$, $t_{32}$, and $t_{42}$ and rises to a logical level "H" at the following times $t_{13}$, $t_{23}$, $t_{33}$, and $t_{43}$ in accordance with the pulses PB1X, PB2X, PB3X, and PB4X of the signal with shaped waveform S12.

As a result, the ramp signal generator 14 performs an integrating operation during an integration period when the horizontal-direction integral controlling signal S13A (FIG. 4(A)) is at a logical level "L", that is, between the times $t_{11}$–$t_{12}$, $t_{21}$–$t_{22}$, $t_{31}$–$t_{32}$, and $t_{41}$–$t_{42}$. The ramp signal generator 14 thereby delivers, as the ramp signal S14 of FIG. 1, a ramp signal S14A corresponding to the horizontal direction and having an integrated value corresponding to the sum total of the integration periods as shown in FIG. 4(B).

Likewise, the ramp signal generator 14 performs an integrating operation during an integration period when the integral controlling signal in the vertical direction S13B (FIG. 5(A)) is at a logical level "L", that is, between the times $t_{12}$–$t_{13}$, $t_{22}$–$t_{23}$, $t_{32}$–$t_{33}$, and $t_{42}$–$t_{43}$. The ramp signal generator 14 thereby delivers, as the ramp signal S14 of FIG. 1, a ramp signal S14B corresponding to the vertical direction and having an integrated value corresponding to the sum total of the integration periods as shown in FIG. 5(B).

The thus obtained horizontal-direction ramp signal S14A and vertical-direction ramp signal S14B are supplied through an analog-to-digital converter 15 (FIG. 1) to an error data retaining circuit 16.

The error data retaining circuit 16 compares the horizontal-direction and vertical-direction ramp signals S14A and S14B obtained for each of red, green, and blue electron beams with their respective horizontal and vertical position reference values, retains in storage the then obtained deviation data for all the index patterns 3 as horizontal and vertical convergence error data, and delivers the horizontal and vertical convergence error data S15 to a convergence and deflection circuit 17.

On the basis of the horizontal and vertical convergence error data S15 and a synchronization signal S17 delivered from the reference signal generator 18, the convergence and deflection circuit 17 supplies a deflection waveform signal S16 including a correction signal capable of appropriate convergence correction to convergence correction coils 19 and deflection yokes 20, whereby convergence of the cathode ray tube 1 is automatically adjusted.

When the apparatus described above is in an adjusting mode and a red drive signal, green drive signal, and blue drive signal are successively supplied as a drive signal S10 from the reference signal generator 18 to the cathode ray tube 1, ramp signal data S19 formed of digitized ramp signals S14 for red, green, and blue colors are received by the error data retaining circuit 16. In the error data retaining circuit 16, error data corresponding to the difference between the reference position of each index pattern 3 and the landing positions of the red, green, and blue electron beams obtained on the basis of the aforesaid ramp signal data S19 are stored as convergence error data.

More particularly, an electron beam 4 constituting a red (or green or blue) electron beam generated by a drive signal S10 constituting a red (or green or blue) drive signal is caused to scan the index pattern 3 (FIG. 3(A)), and detected signals S11 thereby obtained (FIGS. 3(B1)–(E1)) are subjected to the slicing process in the waveform shaping circuit 13.

The rising times of the signals with shaped waveform S12 (FIGS. 3(B2)–(E2)) obtained as a result of the aforementioned process deviate from normal values as a result of noise mixed in with the detected signals S11. The ramp signals S14 including such deviations (FIGS. 4 and 5) are obtained in the ramp signal generator 14, and these are received by the error data retaining circuit 16 as the digital ramp signal data S19.

The ramp signal data S19 received by the error data retaining circuit 16 are, as described with reference to FIGS. 3–5 in the foregoing, adapted to be obtained on the basis of the integrated values according to the integral controlling signals S13 formed as the result of sequential scanning by the electron beam 4 along a plurality of scanning lines, for example four scanning lines SCN1–SCN4, for each index pattern 3. Therefore, even though noise is inevitably mixed in with the detected signals S11, the effect of the noise on the convergence error data can be greatly reduced.

Since the noise mixed in with the detected signal S11 is produced at random times and has random amplitudes, when the signals with shaped waveform S12 including such random noise components are integrated for four scanning lines SCN1–SCN4, in substance, the noise components are partially canceled and the noise component finally remaining in the ramp signal data S19 becomes much smaller relative to the information signal than in the case described above with reference to FIG. 6. In other words, the signal-to-noise ratio is greatly improved.

The convergence error data S15 retained in the error data retaining circuit 16 as described above are supplied to the convergence and deflection circuit 17 in the service mode. In this mode, the cathode ray tube 1 is caused to form a display in accordance, for example, with a video signal, instead of the drive signal S10, whereby a picture image automatically adjusted for convergence can be displayed on the display screen 5 of the cathode ray tube 1.

In the embodiment of the invention described above, signals S11 including the mixed-in noise components are integrated for four scanning lines SCN1–SCN4 and convergence error data are formed on the basis of the integrated results. Hence it is possible to obtain a convergence error signal wherein the effect of noise is greatly reduced.

In the embodiment of the invention described above, the convergence error data is obtained on the basis of detected signals S11 from four scanning lines within the same field on one index pattern wherein the conventional interlaced scanning procedures are used, but the present invention is not limited thereto. Results similar to those described above can be obtained even if the data are derived from a plurality of scanning lines other than four.

Although the embodiment described above employs an index pattern in the form shown in FIG. 3 (a so-called lambda pattern), the invention is not limited to the employment of that particular pattern; other forms of index pattern can of course be used equally well.

In the embodiment of the invention described above, the integral calculation is based on detected signals from a plurality of successive scanning lines, but the purpose will be served just as well by performing an adding calculation, inclusive of the integral calculation, based on other detected signals from within the same field, whether this field is odd or even.

According to the present invention as described above, detected signals are obtained from a plurality of scanning lines and convergence error data is obtained by adding (integrating) these signals. Therefore, the effect of noise included in the detected signals can be greatly reduced and thus convergence correction with high accuracy can be attained.

We claim:

1. An automatic convergence correcting circuit for use with a color cathode ray tube formed with a shadow mask, at least one index pattern disposed at a predetermined position on the shadow mask, means for generating an electron beam for scanning the index pattern in a plurality of traverses, and means for detecting light reflected upon scanning of the index pattern by the beam and generating a detected signal that corresponds to the reflected light and is representative of the scanning position of the electron beam; said correcting circuit comprising:

a waveform-shaping circuit for converting the detected signal into a two-level signal;

a ramp signal generator receiving the two-level signal as a timing signal for raising an integral controlling signal to a first level and receiving a reference signal as a timing signal for lowering the integral controlling signal to a second level, said ramp signal generator performing effective integration only during time periods when the integral controlling signal is at a selected one of the first and second levels and producing a ramp signal having an integrated value corresponding to the sum total of the integration periods;

means responsive to the ramp signal output from said ramp signal generator for generating a signal representing convergence error information for controlling the convergence of the electron beam;

whereby the effect of noise included in the detected signal is reduced and convergence correction with increased accuracy is obtained.

2. A circuit according to claim 1 wherein the scanning by the electronic beam is effected in a succession of scanning lines forming a succession of fields and said plurality of traverses are effected in successive ones of said scanning lines in the same field.

3. A correcting circuit according to claim 1 wherein the index pattern is a lambda pattern.

4. A correcting circuit according to claim 1 wherein the scanning by the electron beam is effected in a succession of scanning lines forming a succession of fields, there are a plurality of index patterns respectively disposed at predetermined positions on the shadow mask, the ramp signal generator integrates a detected signal for each of the index patterns, and the convergence error information is obtained for a plurality of locations in a given field.

5. A correcting circuit according to claim 4 wherein said given field is an odd field.

6. A correcting circuit according to claim 4 wherein said given field is an even field.

7. A correction circuit according to claim 3, wherein a vertical element of said lambda pattern produces pulses in said detected signal relating to a horizontal direction of the electron beam scan and a slanted element of said lambda pattern produces pulses in said detected signal relating to a vertical direction of the electron beam scan and the ramp signal generator performs integration when a horizontal-direction integral controlling signal is at a selected level to produce a ramp signal having an integrated value corresponding to the sum total of all horizontal integration periods and said ramp signal generator performs integration when a vertical-direction integral controlling signal is at the selected level to produce a ramp signal having an integrated value corresponding to the sum total of all horizontal integration periods, said ramp signals being fed to said means for generating a signal representing convergence error information.

8. A correction circuit according to claim 7, wherein the horizontal-direction integral controlling signal and said vertical-direction integral controlling signal make up said integral controlling signal.

9. A correction circuit according to claim 8, wherein said first level of said integral controlling signal is a low level and said second level is a high level.

10. A correction circuit according to claim 9, wherein the selected level during which said ramp generator performs effective integration is a low level.

* * * * *